United States Patent
Yokota et al.

(10) Patent No.: US 9,572,031 B2
(45) Date of Patent: Feb. 14, 2017

(54) INFORMATION PROCESSING DEVICE AND AUTHENTICATION CONTROL METHOD

(71) Applicant: FUJITSU LIMITED, Kawasaki-shi, Kanagawa (JP)

(72) Inventors: Koichi Yokota, Yokohama (JP); Hiroyasu Sugano, Koto (JP); Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 14/598,676

(22) Filed: Jan. 16, 2015

(65) Prior Publication Data

US 2015/0281959 A1    Oct. 1, 2015

(30) Foreign Application Priority Data

Mar. 31, 2014  (JP) ................... 2014-072984

(51) Int. Cl.
*G06F 7/04* (2006.01)
*H04W 12/06* (2009.01)
*H04W 12/08* (2009.01)

(52) U.S. Cl.
CPC ............. *H04W 12/06* (2013.01); *H04W 12/08* (2013.01)

(58) Field of Classification Search
CPC ............................... H04W 12/06; H04W 12/08
USPC ............................................................ 726/7
See application file for complete search history.

(56) References Cited

U.S. PATENT DOCUMENTS

| 9,083,624 | B2* | 7/2015 | Westin | H04L 41/12 |
| 9,363,757 | B2* | 6/2016 | Takahashi | H04W 52/0254 |
| 2013/0036231 | A1* | 2/2013 | Suumaki | H04W 12/04 709/228 |
| 2013/0309971 | A1* | 11/2013 | Kiukkonen | H04L 63/107 455/41.2 |
| 2015/0245298 | A1* | 8/2015 | Takahashi | H04W 52/0254 455/574 |

FOREIGN PATENT DOCUMENTS

JP    2013-258650    12/2013

* cited by examiner

*Primary Examiner* — Samson Lemma
(74) *Attorney, Agent, or Firm* — Staas & Halsey LLP

(57) ABSTRACT

Any one of information processing devices among a plurality of the information processing devices capable of communicating with one another, the information processing device includes a processor; and a memory which stores a plurality of instructions, which when executed by the processor, cause the processor to execute: if the own device is first activated among the plurality of information processing devices having been shut down at a specific time, enabling a connection mode of a wireless LAN, and waiting until a connection is established from another information processing device among the plurality of information processing devices; setting authentication information based on information obtained through wireless LAN communication from the activated information processing device; and performing authentication for enabling the own device based on the authentication information.

9 Claims, 12 Drawing Sheets

FIG. 3A

| | 210 | 211 |
|---|---|---|
| | PSv | BSSID |
| | PSv-C1 | AA:BB:CC:DD:EE:FF |
| | PSv-S | AB:CD:EF:GH:IJ:KL |
| | PSv-C2 | 11:22:34:XY:ZZ:WW |
| | PSv-C3 | WW:YY:ZZ:12:34:66 |
| | PSv-C4 | 09:87:65:CR:UI:KL |

FIG. 3B

| 212 | 213 | 214 | 215 | 216 | 217 |
|---|---|---|---|---|---|
| ACTIVATION ORDER | ACTIVATION TIME | BSSID | BSSID INFORMATION GROUP TO BE DETECTED | BSSID INFORMATION GROUP NOT TO BE DETECTED | RADIO FIELD INTENSITY |
| 1 | 08:30 | AB:CD:EF:GH:IJ:KL | ※ | | -50dBm |
| 2 | 08:32 | WW:YY:ZZ:12:34:66 | AB:CD:EF:GH:IJ:KL | BSSID INFORMATION OTHER THAN BSSID INFORMATION TO BE DETECTED | -61dBm |
| 3 | 08:34 | AA:BB:CC:DD:EE:FF | AB:CD:EF:GH:IJ:KL,WW:YY:ZZ:12:34:66 | | -91dBm |
| 4 | 08:36 | 09:87:65:CR:UI:KL | AB:CD:EF:GH:IJ:KL,WW:YY:ZZ:12:34:66, 09:87:65:CR:UI:KL | | -85dBm |
| 5 | 08:38 | 11:22:34:XY:ZZ:WW | ※ | | -70dBm |

※ BSSID INFORMATION GROUP TO BE DETECTED OF THE SERVERS HAVING ACTIVATION ORDERS OF FIRST AND LAST HAS THE SAME CONDITION AS THAT OF ANY ONE OF THE SERVERS HAVING ACTIVATION ORDERS FROM SECOND TO FOURTH

INFORMATION PROCESSING DEVICE AND AUTHENTICATION CONTROL METHOD

CROSS-REFERENCE TO RELATED APPLICATION

This application is based upon and claims the benefit of priority of the prior Japanese Patent Application No. 2014-072984, filed on Mar. 31, 2014, the entire contents of which are incorporated herein by reference.

FIELD

The embodiments discussed herein are related to an information processing device, and an authentication control method and program, for example.

BACKGROUND

It is currently widespread that users access a server having a function of an access point in a wireless local area network (LAN), and download an application program (hereinafter, also referred to as an "application") from the server to their mobile devices for use as occasion calls. For example, there are cases where when a user visits a store, or the like, the user downloads an application using a smart phone, a tablet terminal, or the like "on the spot", and uses the application.

In the case of a device that is connected to a cloud computer through the Internet, if the device is stolen, it is possible to lock the device by control data transmitted from the cloud computer to the device, or to delete storage data in the device. However, in the case of a device that does not have a connection function to the Internet, the device is not capable of obtaining the control data, and thus it is difficult to protect the device by the above-described method, and to avoid leakage of internal information.

Thus, a method of encrypting storage data in a device is provided as another countermeasure against the case where the device is stolen. However, in this method, a user has to manage the same number of decryption passwords as the number of the devices, and thus there is a problem in that it takes much time and effort.

As another countermeasure against the case where a device is stolen, Japanese Laid-open Patent Publication No. 2013-258650 has proposed an anti-theft featured communication terminal in which whether a radio communication server is located in a predetermined communication range or not is detected from a communication state of the radio communication, and if not located within the communication range, a warning is output.

SUMMARY

In accordance with an aspect of the embodiments, any one of information processing devices among a plurality of the information processing devices capable of communicating with one another, the information processing device includes a processor; and a memory which stores a plurality of instructions, which when executed by the processor, cause the processor to execute: if the own device is first activated among the plurality of information processing devices having been shut down at a specific time, enabling a connection mode of a wireless LAN, and waiting until a connection is established from another information processing device among the plurality of information processing devices; setting authentication information based on information obtained through wireless LAN communication from the activated information processing device; and performing authentication for enabling the own device based on the authentication information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIGS. 3A and 3B are diagrams illustrating an example of an authentication information storage DB according to an embodiment;

DESCRIPTION OF EMBODIMENTS

In the following, a description will be given of embodiments of the present disclosure with reference to the drawings. In this regard, in the embodiments and drawings, the same symbol is given to a component having substantially the same functions, and a duplicated description will be omitted.

Anti-Theft Measure System

Figure 1:
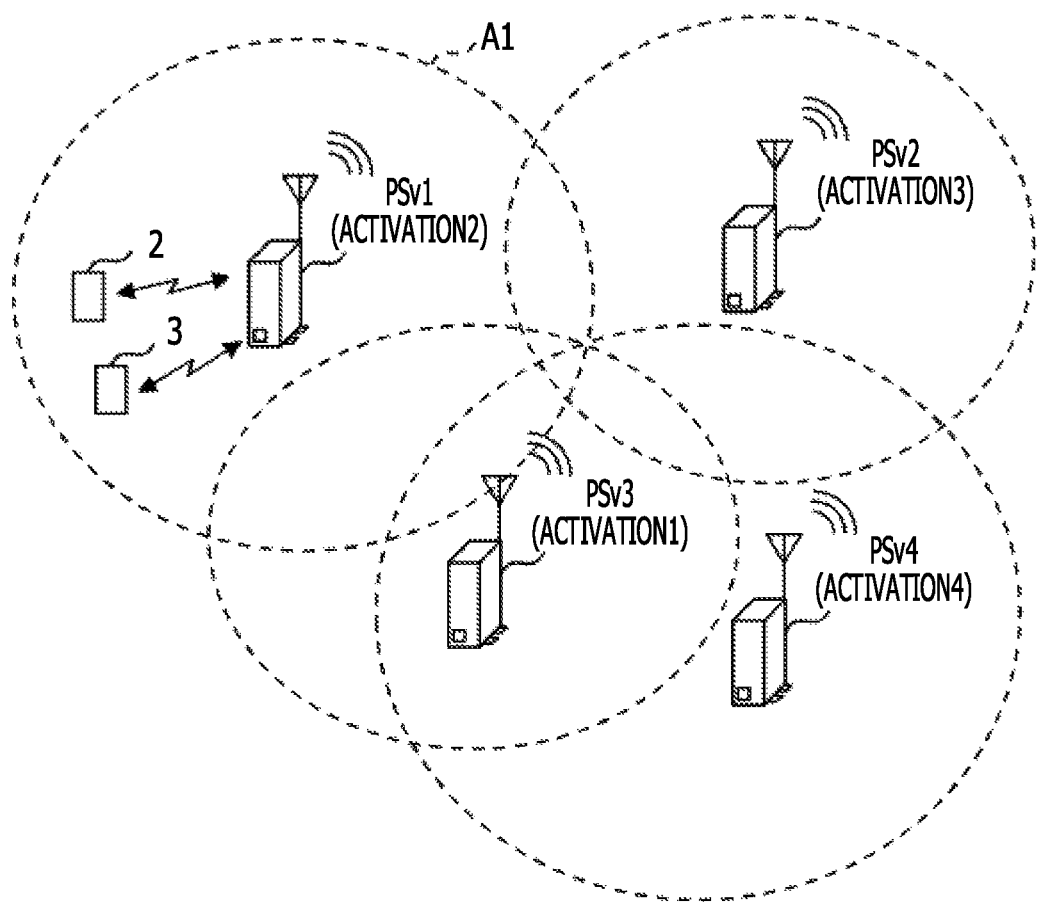
FIG. 1 is a diagram illustrating an example of an anti-theft measure system of servers according to an embodiment.

First, a description will be given of an anti-theft measure system of servers according to an embodiment with reference to FIG. 1. FIG. 1 illustrates an example of the anti-theft measure system of the servers according to an embodiment.

A plurality of servers PSv1 to PSv4 (hereinafter, also generically referred to as a "server PSv") illustrated in FIG. 1 are examples of a plurality of information processing devices capable of communicating with one another. The information processing devices are not limited to servers, and may be electronic devices, such as personal computers, or the like. The anti-theft measure system according to the present embodiment autonomously performs authentication of each server using information among a plurality of servers that perform delivery services so as to achieve a countermeasure against a theft of each server, and to improve a security level of each server.

The plurality of servers PSv1 to PSv4 have a function of an access point in a wireless LAN, respectively, and provides services to deliver information that meets the location of a user to devices located in a predetermined area (for example, an area within about 20 to 30 meters from the server) where wireless LAN radio waves reach the location of the user. For example, in FIG. 1, the server PSv1 delivers information to a smart phone 2 and a tablet terminal 3 in an area A1.

In the present embodiment, a specific server among the plurality of servers PSv1 to PSv4 determines the activation order of each server, and a basic service set identifier (BSSID) information group to be detected. FIG. 1 illustrates an example in which the servers PSv1 to PSv4, that are capable of communicating with one another are activated in the order of the server PSv3→the server PSv1→the server PSv2→the server PSv4. In this case, first, the activated server PSv3 determines the activation order at the next activation time of each server, and a BSSID information group to be detected by each server. Each server is activated at timing in accordance with the determined activation order. Each activated server performs scanning of neighboring wireless LANs, and checks the BSSIDs transmitted in the periphery. As a result, if the server has detected a BSSID information group to be detected, the server enables the function of delivering an application of the own device.

In the example illustrated in FIG. 1, the server PSv2 is activated thirdly. Accordingly, the BSSID information group to be detected by the server PSv2 becomes the BSSIDs of the server PSv1 and the server PSv3, which have been activated first, and secondly, respectively. If the server PSv2 determines that it is not possible to detect all the BSSID information groups to be detected, the server PSv2 disables the function of delivering the application of the own device, and makes it not possible to load the application data for delivery.

In the above, a description has been given of an anti-theft measure system of severs according to an embodiment. In the present embodiment, a plurality of servers individually perform authentication autonomously using information among the individual servers. With this configuration, it is possible for each of the servers to monitor with each other to determine whether to enable the function of each of the servers. Thereby, it is possible to easily improve the security level of each server. At that time, each server may update authentication information randomly. Updating the authentication information may be performed on a regular basis or irregularly. For the authentication information exchanged among servers, it is possible to use the SSID information to be detected at activation time, the SSID information not to be detected at activation time, the reception radio field intensity, and the like in addition to the activation order of each server.

In this regard, the SSID information may include BSSID information, and ESSID information. In the following, among a plurality of servers capable of communicating with one another, a server that was activated first is also called a master server "PSv-S", and the servers that were activated secondly and after that are also called slave servers "PSv-C".

Example of Functional Configuration of Server

Figure 2:
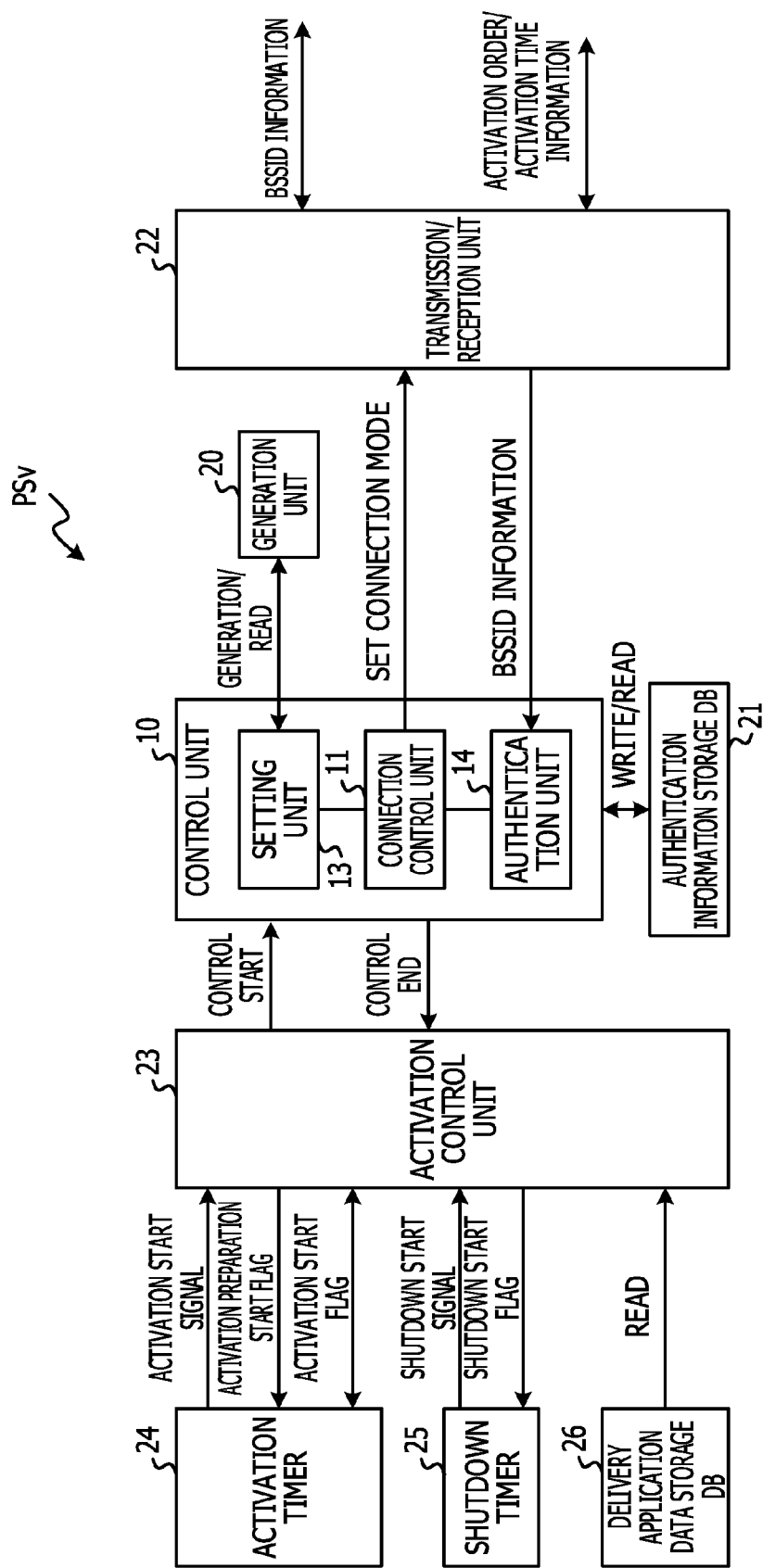
FIG. 2 is a diagram illustrating an example of a functional configuration of the server according to an embodiment.

Next, a description will be given of an example of a functional configuration of a server according to the present embodiment with reference to FIG. 2. FIG. 2 illustrates an example of a functional configuration of the server according to an embodiment. A plurality of servers capable of communicating with one another have the same functional configuration.

The server PSv includes a control unit 10, a generation unit 20, an authentication information storage database 21 (hereinafter, a "database" is described as a "DB"), a transmission/reception unit 22, an activation control unit 23, an activation timer 24, a shutdown timer 25, and a delivery application data storage DB 26.

The control unit 10 performs the entire control of the server PSv, such as authentication control of the server according to the present embodiment, delivery control of application data, and the like. The control unit 10 includes a connection control unit 11, a setting unit 13, and an authentication unit 14.

The generation unit 20 randomly generates numeric values. The generation unit 20 serves as an internal function of the server PSv. However, the generation unit 20 may not serve as an internal function of the server PSv. In that case, the setting unit 13 receives input of random numeric values from the outside.

The setting unit 13 sets an activation order of each server PSv based on the generated numeric value. Also, the setting unit 13 sets the SSID information to be detected by each server PSv, and the activation time information based on the activation order. For the activation time information, time at which each server PSv is restarted after shutdown is set. The setting unit 13 may set the SSID information not to be detected based on the activation order. The setting unit 13 may set the radio field intensity information of a wireless LAN from the communication state with the other server PSv.

The transmission/reception unit 22 is an example of a reception unit that receives the SSID information of a wireless LAN from another server PSv. Also, the transmission/reception unit 22 is an example of a transmission unit that notifies at least one of the SSID information to be detected, the SSID information not to be detected, and the activation time information.

The transmission/reception unit 22 transmits at least one of the BSSID information group to be detected, and the BSSID information group not to be detected. The transmission/reception unit 22 may transmit radio field intensity information BSSID information group to be detected.

The activation control unit 23 carries out shutdown after receiving the notification, and then restarts the own apparatus at a time corresponding to the activation time information.

The shutdown timer 25 outputs a shutdown start signal when predetermined time has come in a time slot in which each server PSv does not load an application. For an example of a time slot in which a delivery application is loaded, a time slot after ending store operation, and before starting store operation is given. On the other hand, for an example of a time slot in which a delivery application is loaded, a time slot of after starting store operation and before ending store operation is given. The activation timer 24 outputs an activation start signal when a time corresponding to the activation time information has come after starting measuring time from the shutdown of the own server.

The activation control unit 23 shuts down the own server at a time when the shutdown signal is input. Also, the activation control unit 23 restarts the own server at a time when the activation start signal is input.

The delivery application data storage DB 26 stores application data to be delivered to devices in a predetermined area where the server is allowed to communicate with.

The authentication information storage DB 21 stores authentication information. FIGS. 3A and 3B illustrate an example of information including the authentication information stored in the authentication information storage DB 21. FIG. 3A illustrates an example of BSSID information 211 of each server PSv 210 that is stored in the authentication information storage DB 21. Here, as the BSSID information of the master server PSv-S, "AA:BB:CC:DD:EE:FF" is stored. Also, as the BSSID information of the slave servers PSv-C1 to PSv-C4, "AB:CD:EF:GH:IJ:KL", "11:22:34:XY:ZZ:WW", "WW:YY:ZZ:12:34:66", and "09:87:65:CR:UI:KL" are stored, respectively.

FIG. 3B illustrates an example of the authentication information of each server PSv, which is stored in the authentication information storage DB 21. The authentication information of each server PSv includes activation order information 212, activation time information 213, BSSID information 214, BSSID information to be detected 215, BSSID information not to be detected 216, and radio field intensity information 217, which are set by the master server PSv-S.

Here, the activation order information 212 is set in the following order: the master server PSv-S, the slave server PSv-C3, the slave server PSv-C1, the slave server PSv-C4, and the slave server PSv-C2. The BSSID information to be detected 215 for the master server PSv-S to be activated first, and the slave server PSv-C2 to be activated last includes the same condition as the BSSID information to be detected 215 of any one of the servers having the activation order of the second to the fourth. The BSSID information to be detected 215 of the servers having the activation order of the second to the fourth includes all the BSSID information 215 of the servers that had been activated when each of the servers was activated.

The BSSID information not to be detected 216 is the BSSID information other than the BSSID information to be detected 215. For example, the BSSID information 216 not to be detected of the serer whose activation order information 212 is "4" becomes "11:22:34:XY:ZZ:WW". The activation time information 213 stores the value set by the master server PSv-S. The BSSID information 214 stores the BSSID received from the other slave servers PSv-C. The radio field intensity information 217 stores information on the radio field intensity in the communication with the other slave servers PSv-C. In the above, a description has been given of the functional configuration of the server PSv according to the present embodiment.

Connection Mode Determination Processing

Figure 4:
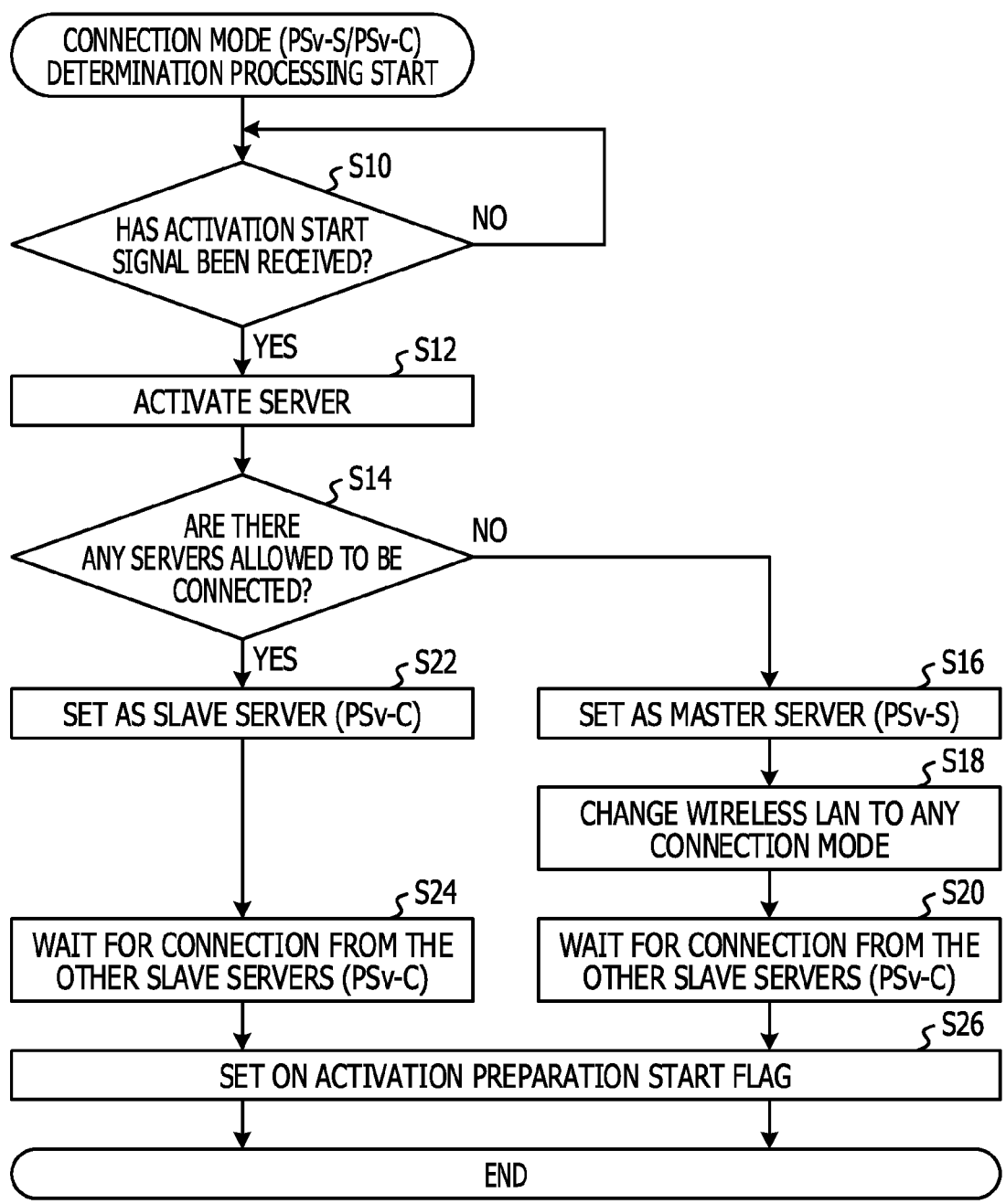
FIG. 4 is a flowchart illustrating an example of connection mode determination processing according to an embodiment.

Next, a description will be given of an example of connection mode determination processing executed by each server PSv with reference to FIG. 4. FIG. 4 is a flowchart illustrating an example of the connection mode determination processing according to an embodiment.

If the activation start flag is set on, each server PSv starts the connection mode determination processing. In the connection mode determination processing, first, the activation control unit 23 determines whether an activation start signal has been received (step S10). The activation control unit 23 repeats the processing in step S10 while a determination is made that an activation start signal has not been received. If the activation control unit 23 determines that an activation start signal has been received, the activation control unit 23 activates the own server (step S12). Next, the connection control unit 11 scans neighboring wireless LANs, and determines whether there are servers PSv that are allowed to be connected to (step S14).

If the connection control unit 11 determines that there are no servers PSv that are allowed to be connected to, the setting unit 13 sets the own server to a master server PSv-S (step S16). Next, the connection control unit 11 changes the wireless LAN to an ANY connection mode (step S18). The ANY connection mode is a mode in which any access points are allowed to be connected to.

Next, the connection control unit 11 waits for a connection from the other slave servers PSv-C (step S20). The connection control unit 11 sets on an activation preparation start flag that instructs to start activation preparation processing (step S26), and terminates this processing.

On the other hand, in step S14, if the connection control unit 11 determines that there is a server PSv that is allowed to be connected to, the setting unit 13 sets the own server to a slave server PSv-C (step S22). Next, the connection control unit 11 connects to the master server PSv-S through the wireless LAN (step S24). Next, the connection control unit 11 sets on the activation preparation start flag (step S26), and terminates this processing.

Figure 5B:
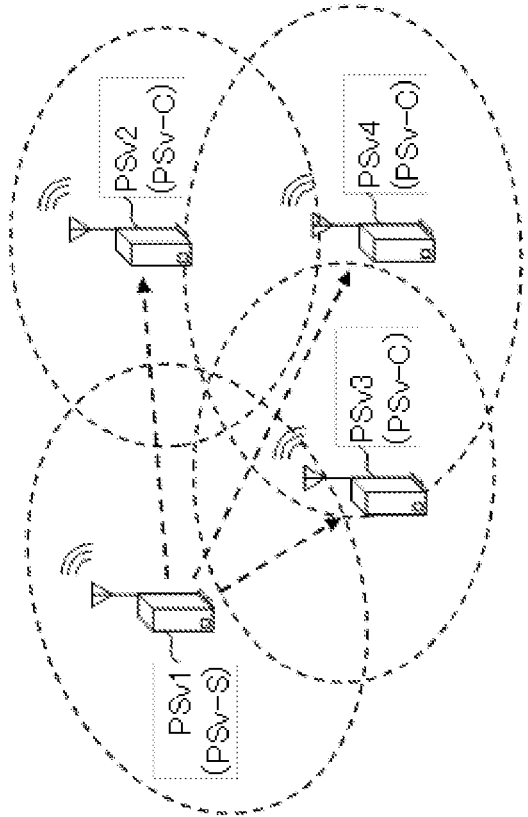
FIGS. 5A and 5B are diagrams illustrating an example of a connection mode determination result according to an embodiment.
Figure 5A:
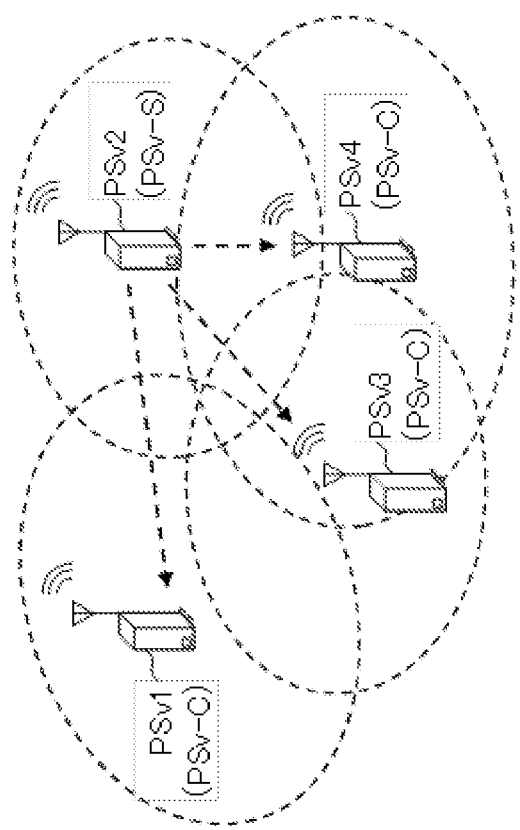

In the above, a description has been given of an example of the connection mode determination processing executed by each server PSv. With this configuration, as illustrated in FIG. 5A and FIG. 5B, any one of the individual servers may be a master server PSv-S and a slave server PSv-C. For example, at a point in time in FIG. 5A, the server PSv1 has been activated first, and thus the server PSv1 becomes a master server PSv-S, and the other servers become the slave servers PSv-C. At a point in time in FIG. 5B, the server PSv2 has been activated first, and thus server PSv2 becomes a master server PSv-S, and the other servers become slave servers PSv-C. The master server PSv-S generates authentication information using information among the individual servers, and notifies the authentication information to the slave servers PSv-C. Each of the servers PSv autonomously performs authentication of the own server using the notified authentication information. In this manner, each of the servers monitors with one another so as to determine enabling of the application delivery function of each server. Thereby, a determination is made as to whether the application data to be delivered to devices in a predetermined area is allowed to be loaded or not.

Server Activation Preparation Processing

Figure 6:
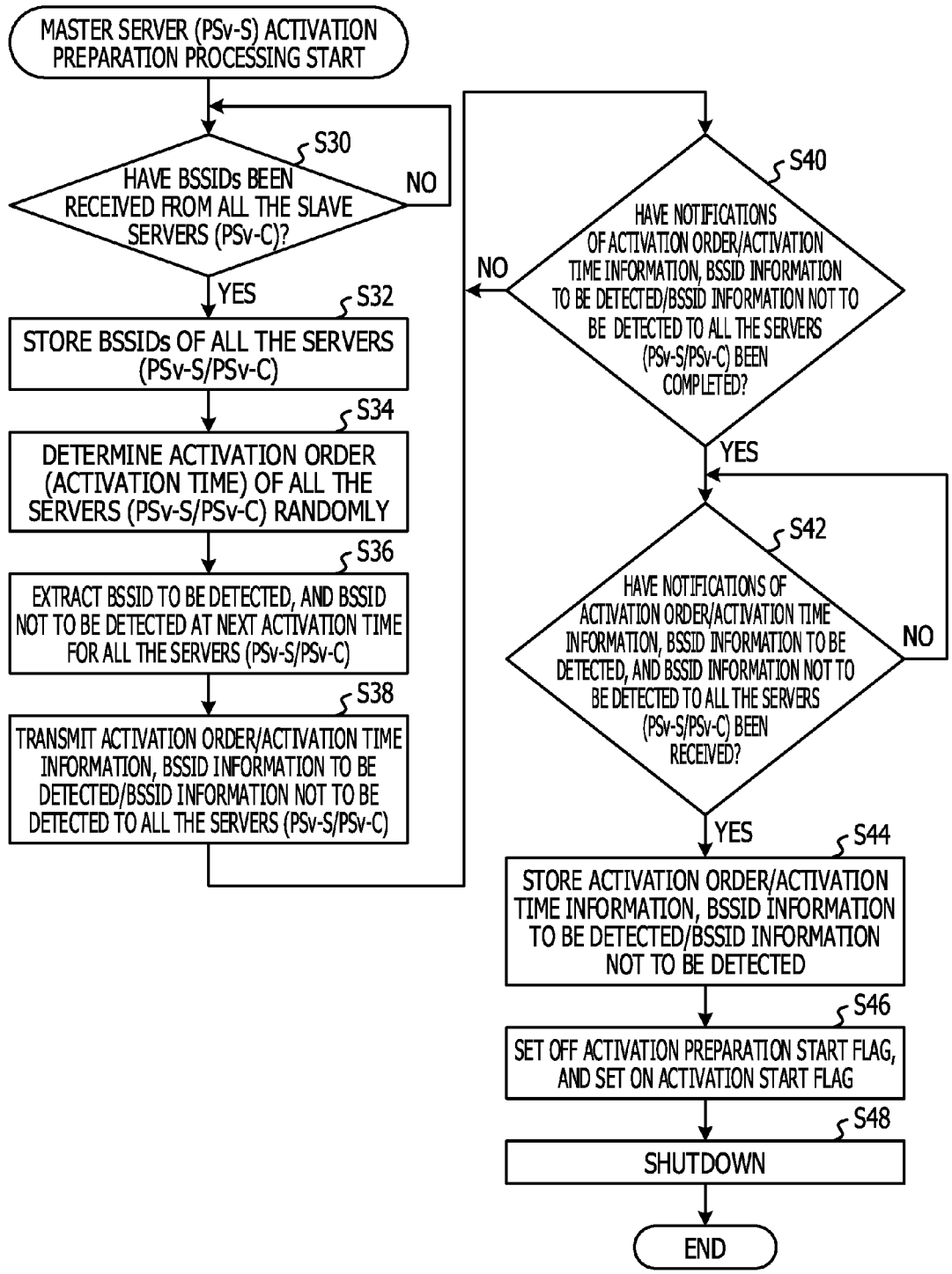
FIG. 6 is a flowchart illustrating an example of activation preparation processing of a master server according to an embodiment.

Next, a description will be given of an example of the activation preparation processing of the master server at the time of next activation with reference to a flowchart in FIG. 6. Also, a description will be given of an example of the activation preparation processing of the slave server with reference to a flowchart in FIG. 7.

Master Server Activation Preparation Processing

First, a description will be given of the activation preparation processing of the master server PSv-S. If the activation preparation start flag is set on, the master server PSv-S starts the activation preparation processing. First, the transmission/reception unit 22 determines whether BSSID information has been received from all the slave servers PSv-C (step S30), and repeats the processing in step S30 until BSSID information has been received from all the slave servers PSv-C.

If the transmission/reception unit 22 has received BSSID information from all the slave servers PSv-C, the setting unit 13 stores the BSSID information of all the servers (PSv-S/PSv-C) into the authentication information storage DB 21 (step S32). Thereby, the authentication information storage DB 21 stores the BSSID information 211 for each of the servers PSv 210 illustrated in FIG. 3A.

Next, the setting unit 13 sets the activation order and the activation time of each server PSv based on the random numeric value obtained from the generation unit 20. Thereby, the authentication information storage DB 21 stores the activation order information 212 and the activation time information 213 among the authentication information illustrated in FIG. 3B.

Next, the setting unit 13 extracts the BSSID information to be detected, and the BSSID information not to be detected at next activation time for all the servers (PSv-S/PSv-C) (step S36). Thereby, the authentication information storage DB 21 stores the BSSID information 214, the BSSID information to be detected 215, and the BSSID information not to be detected 216, which are illustrated in FIG. 3B.

The transmission/reception unit 22 transmits the activation order information, the activation time information, the BSSID information to be detected, and the BSSID information not to be detected of each server to all the servers (PSv-S/PSv-C) (step S38). In the following, the activation order information, the activation time information, the BSSID information to be detected, and the BSSID information not to be detected of each server pertain to an example of the authentication information.

The transmission/reception unit 22 determines whether notification of authentication information to all the servers (PSv-S/PSv-C) has been completed (step S40), and repeats the processing in step S40 until the notification of the authentication information is completed. If the transmission/reception unit 22 determines that the notification of the authentication information has been completed, the transmission/reception unit 22 determines whether the authentication information has been notified or not (step S42). If the transmission/reception unit 22 determines that the information has been notified, the setting unit 13 stores the notified authentication information into the authentication information storage DB 21 (step S44). Next, the setting unit 13 sets off the activation preparation start flag, and sets on the activation start flag (step S46). Next, the activation control unit 23 shuts down the own server at a specific time (step S48), and terminates this processing.

Slave Server Activation Preparation Processing

Figure 7:
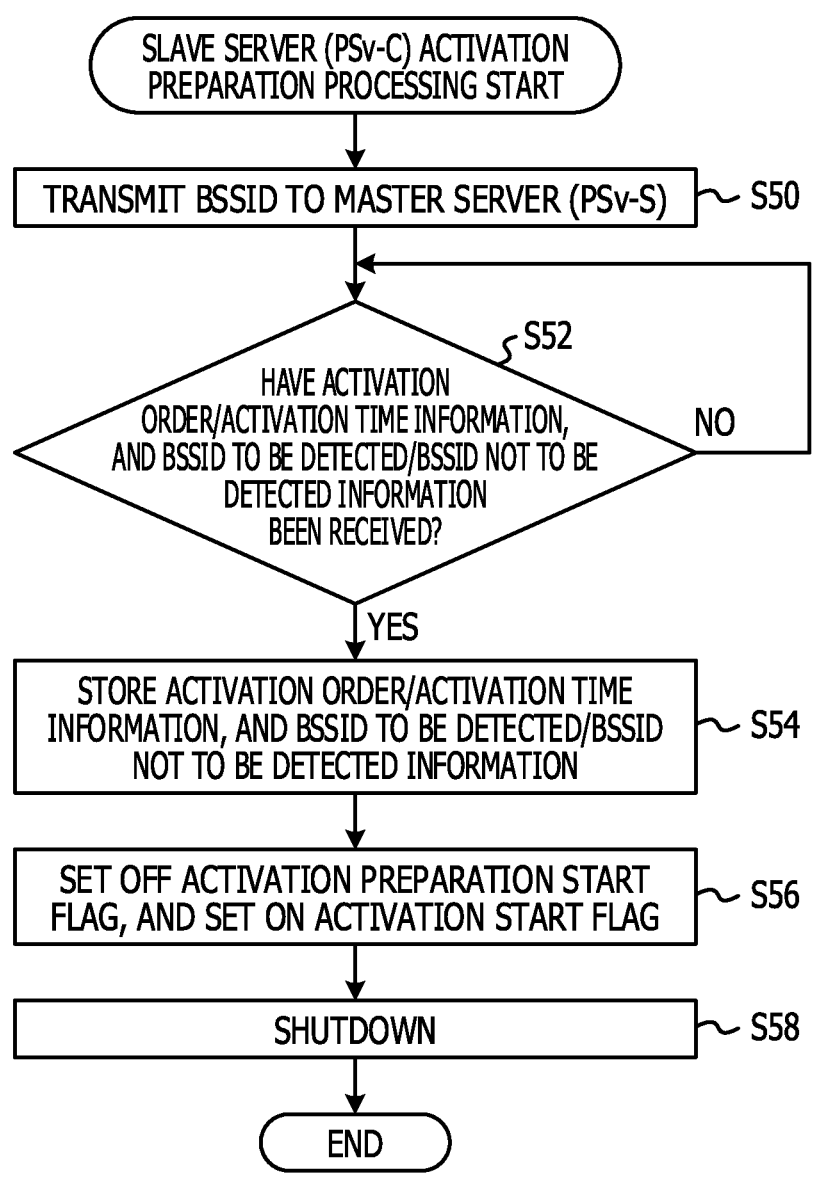
FIG. 7 is a flowchart illustrating an example of activation preparation processing of a slave server according to an embodiment.

Next, a description will be given of the activation preparation processing of the slave server PSv-C at the time of next activation. In the case where the activation preparation start flag is set on, the activation preparation processing of the slave server PSv-C, which is illustrated by a flowchart in FIG. 7, is started. The transmission/reception unit 22 transmits the BSSID information to the master server PSv-S (step S50). Next, the transmission/reception unit 22 determines whether the authentication information has been received (step S52), and repeats the processing in step S52 until the information is received. If the transmission/reception unit 22 determines that the authentication information has been received, the setting unit 13 stores the authentication information into the authentication information storage DB 21 (step S54). Thereby, the authentication information storage DB 21 of each server PSv stores the activation order information 212, the activation time information 213, the BSSID information 214, the BSSID information to be detected 215, and the BSSID information not to be detected 216.

Next, the setting unit 13 sets off the activation preparation start flag, and sets on the activation start flag (step S56). Next, the activation control unit 23 shuts down the own server (step S58), and terminates this processing.

In the above, a description has been given of the activation preparation processing of the master server, and the slave server. With the present embodiment, for example, all of the related servers PVs are shut down at a specific time measured by the shutdown timer 25. After that, as illustrated in FIG. 8, the server PSv is activated randomly (A1 in FIG. 8).

The master server PSv-S that was activated first enables the ANY connection mode of the wireless LAN, and waits for a connection from the other slave servers PSv-C. Each of the slave servers PSv-C that was activated secondly and after that is connected to the master server PSv-S, and then transmits the BSSID information of the wireless LAN of the own server (A2 in FIG. 8).

Figure 8:
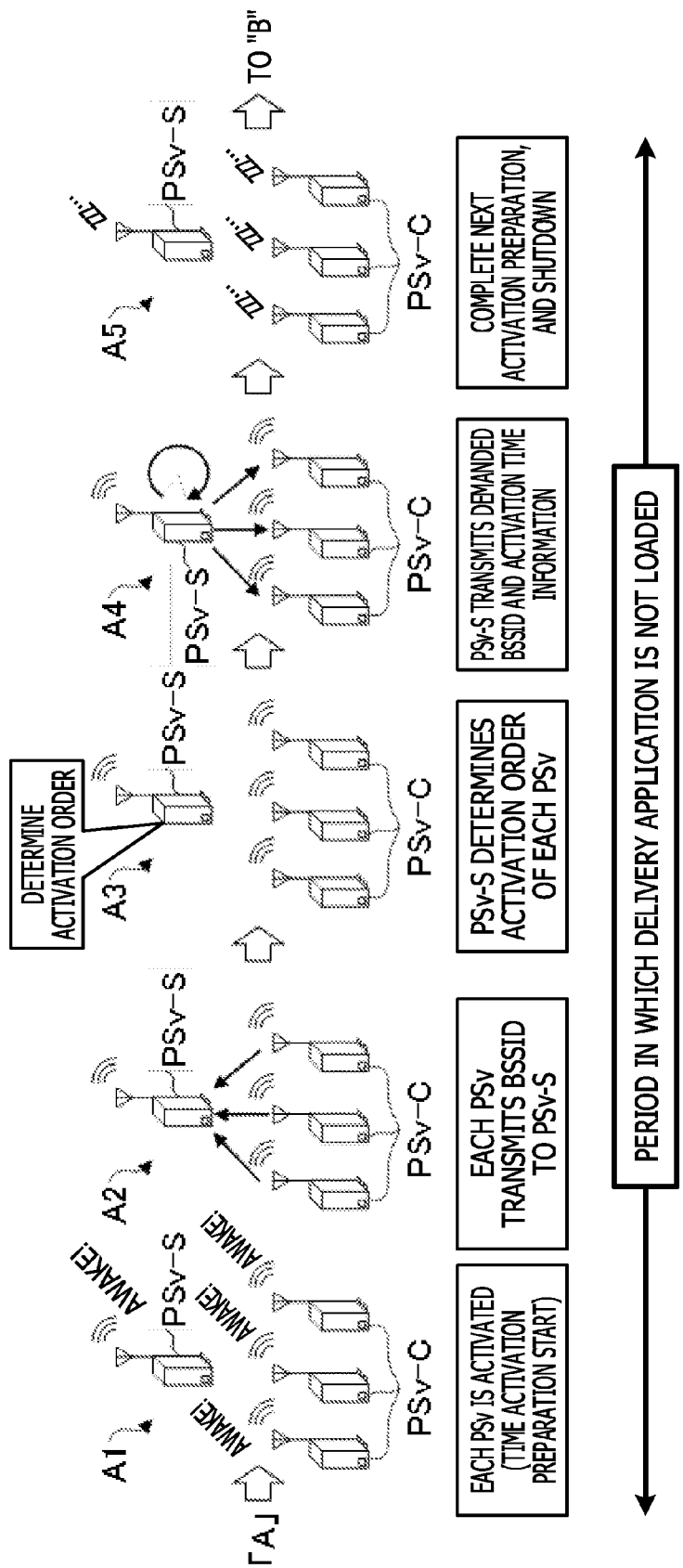
FIG. 8 is an explanatory diagram of activation preparation processing according to an embodiment.

The master server PSv-S randomly determines the authentication information (the activation order, and the like) to be used at next activation time of each server (A3 in FIG. 8). The master server PSv-S notifies the authentication information to each server PSv (A4 in FIG. 8).

Each server PSv stores the notified authentication information, completes the activation preparation processing, and shuts down the own server (A5 in FIG. 8). Thereby, all of the related servers are shut down, and after the passage of a predetermined time period, the processing proceeds to the processing of "B" in FIG. 11. The activation preparation processing by the master server PSv-S and the slave server PSv-C, described above, is performed in a period in which each server PSv does not load delivery application data. In the case where the server PSv is located in a store, it is desirable to execute the processing after end of store operation and before start of the store operation. Next, a description will be given of the activation processing performed in a period in which each server PSv loads delivery application data.

Activation Processing

Figure 9:
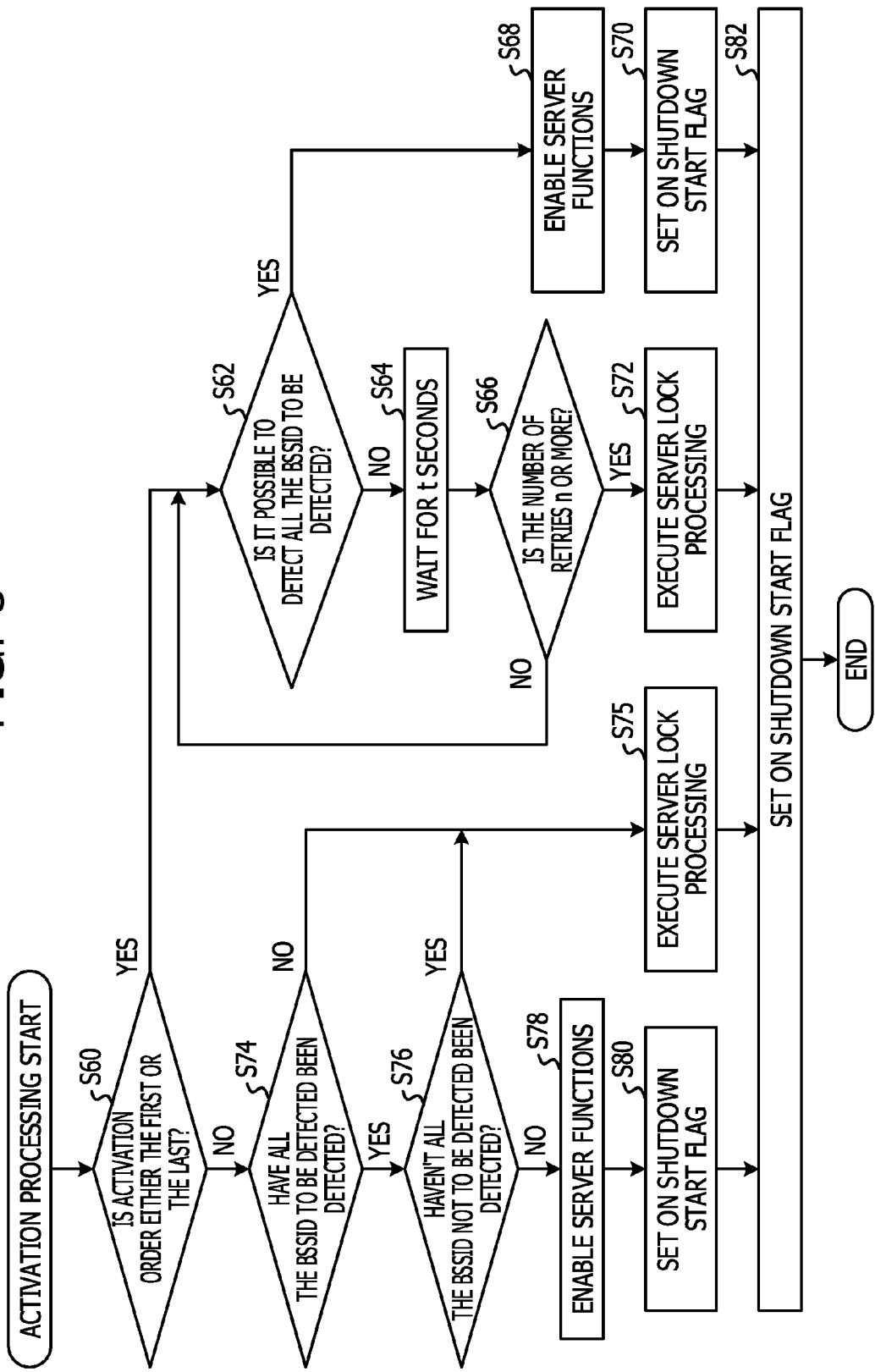
FIG. 9 is a flowchart illustrating an example of activation processing according to an embodiment.

Next, a description will be given of an example of the activation processing (including the authentication processing) executed by each server PSv with reference to a flowchart in FIG. 9. In the case where the activation start flag is set on, each server PSv starts this activation processing. First, the authentication unit 14 reads the activation order information 212 of the own server, which is stored in the authentication information storage DB 21, and determines whether the activation order is set as the first or the last (step S60).

In step S60, if the authentication unit 14 has determined that the activation order is the first or the last, a determination is made as to whether all the set BSSIDs to be detected have been detected (step S62). In this case, the set BSSID to be detected is set to the same condition as the BSSID information to be detected 215 of any servers having the activation order of 2 to activation order of 4. If the authentication unit 14 determines that any one of the BSSIDs to be detected has not been detected, the authentication unit 14 waits for a predetermined t seconds (step S64), and repeats the processing in step S62 to S66 until the number of retries of the determination processing in step S62 becomes n or more (step S66). Thereby, it is possible to secure time until the servers having the activation order of 2 to the activation order of 4 are activated.

If the authentication unit 14 determines that all the BSSIDs to be detected have been detected in step S62, the authentication unit 14 enables the application delivery function of the own server (step S68), and sets on the flag instructing a start of shutdown (step S70). The authentication unit 14 sets off the activation start flag (step S82), and terminates this processing.

On the other hand, in step S66, if the authentication unit 14 determines that the number of retries has become n or more (step S66), the authentication unit 14 locks the own server (step S72), sets off the activation start flag (step S82), and terminates this processing. Thereby, the own server is not allowed to carry out the application delivery service, and thus this serves as an anti-theft measure for the server.

On the other hand, in step S60, if the authentication unit 14 determines that the activation order is neither the first nor the last, the authentication unit 14 determines whether all the BSSIDs to be detected have been detected or not (step S74). If the authentication unit 14 determines that any one of the BSSIDs to be detected has not been detected, the authentication unit 14 locks the own server (step S75), sets off the activation start flag (step S82), and terminates this processing. Thereby, the own server is not allowed to carry out the application delivery service, and thus this serves as an anti-theft measure for the server.

On the other hand, if the authentication unit 14 determines that all the BSSIDs to be detected have been detected, the authentication unit 14 determines whether none of the BSSIDs not to be detected have been detected (step S76). In this regard, after determined as "Yes" in step S62, the authentication unit 14 may determine whether none of the BSSIDs not to be detected have been detected.

If the authentication unit 14 determines that none of the BSSIDs not to be detected have been detected, the authentication unit 14 enables the application delivery function of the own server (step S78). Thereby, the own server is allowed to provide the application delivery service. Next, the authentication unit 14 sets on the shutdown start flag (step S80), sets off the activation start flag (step S82), and terminates this processing.

Figure 11:
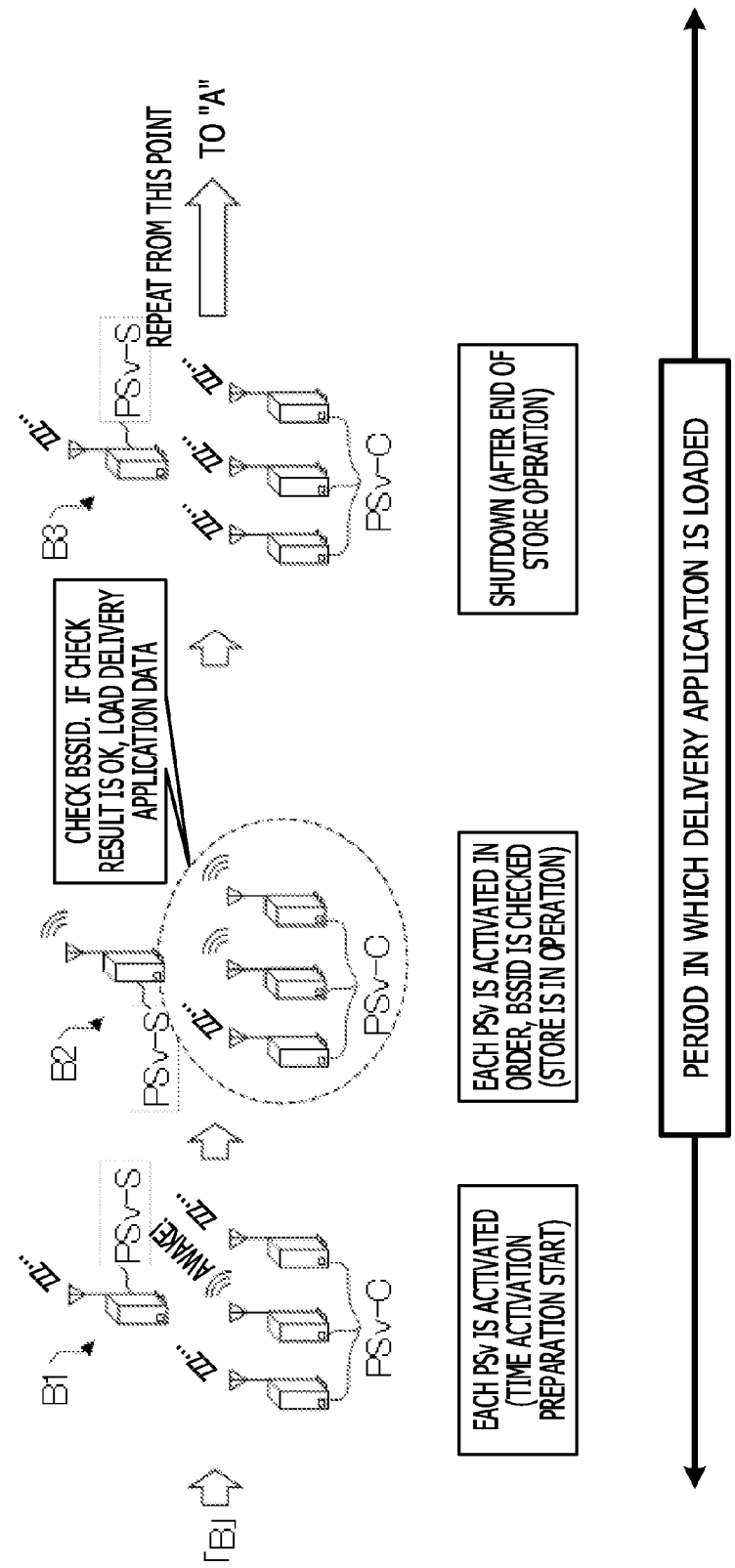
FIG. 11 is an explanatory diagram of activation processing according to an embodiment.

In the above, a description has been given of the activation processing executed by each server. As illustrated in FIG. 11, with the present embodiment, each server PSv is activated in the set activation order (B1 in FIG. 11). For example, it is desirable that this operation is performed before operation is started in a store where each server PSv is located.

Next, each of the activated servers PSv scans the neighboring wireless LANs, and checks the BSSID information transmitted in the neighborhood (B2 in FIG. 11). This operation may be performed during the store operation where each server PSv is located. As a result of the check, if each server has succeeded in detecting the BSSID information group to be detected, each server enables the application delivery function of the own server, and loads the delivery application data (B2 in FIG. 11). Accordingly, if it is not possible for each server to detect the BSSID information group to be detected, and fails in authentication, it is possible to improve the security level of the server by disabling the application delivery function of the server.

Shutdown Processing

Figure 10:
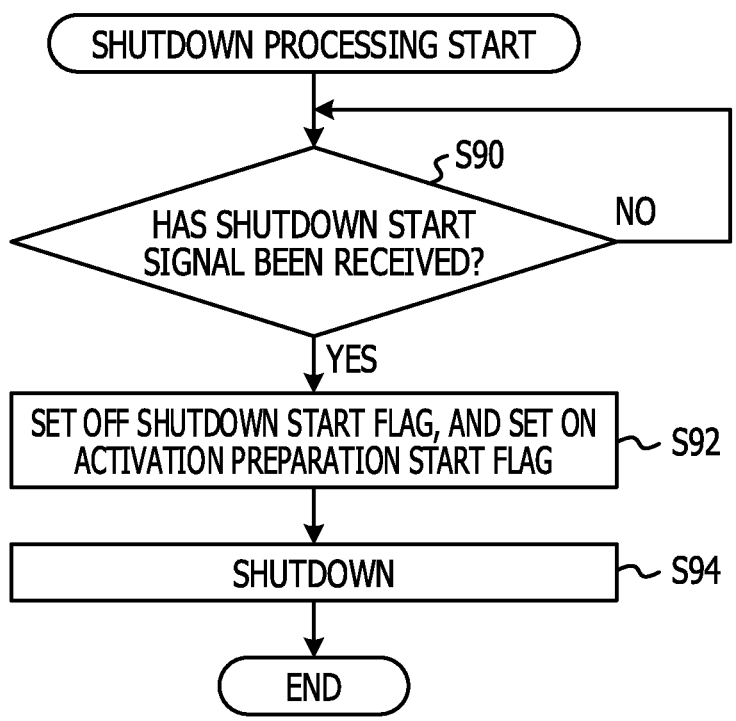
FIG. 10 is a flowchart illustrating an example of shutdown processing according to an embodiment.

Lastly, a description will be given of an example of shutdown processing executed by each server with reference to a flowchart in FIG. 10. If the shutdown start flag is set on, each server PSv starts the shutdown processing. First, the transmission/reception unit 22 determines whether a shutdown start signal has been received (step S90). The shutdown start signal is output from the shutdown timer 25 at a time when a predetermined time period passes after the end of store operation, for example. The transmission/reception unit 22 repeats step S90 until receiving the shutdown start signal. If the transmission/reception unit 22 determines to have received the shutdown start signal, the activation control unit 23 sets on the activation preparation start flag, sets off the shutdown start flag (step S92), shuts down the own server (step S94), and terminates this processing.

Thereby, as illustrated by B3 in FIG. 11, each server PSv is shut down at a specific time. The specific time is desirable to be after the end of store operation when providing an application delivery service is terminated. After that, the activation preparation processing in FIG. 8 and the activation processing (including the authentication processing) in FIG. 11 are repeated. The activation preparation processing indicated by A1 in FIG. 8 is started at the "specific time" controlled by each server PSv when the activation preparation start flag is on. For example, each server PSv may start the activation preparation processing according to the above-described embodiment at a specific fixed time before starting store operation. Also, each server PSv may start the activation preparation processing according to the above-described embodiment at a time requested by another server PSv.

In the above, a description has been given of an anti-theft measure system according to the present embodiment. With the anti-theft measure system according to the present embodiment, if a server PSv fails in authentication because it was not possible to detect all the BSSID information to be detected, or fails in authentication because the BSSID information not to be detected was detected, the server PSv determines that the server might have been stolen, and disables the application delivery function of the server PSv. Thereby, it is possible to improve the security level of each server. Accordingly, for example, even if encrypted data stored in a server PSv in an environment not allowed to connect to a cloud computer is decrypted by a third person, it is possible to avoid data leakage by disabling the application delivery function of the server PSv.

Also, in the case where the server PSv does not encrypt data, a plurality of servers autonomously performs authentication of each server using information among individual servers so that it is possible to secure a certain security level without the user taking time and effort in managing decryption passwords for the number of devices, or the like. Further, for the authentication information, information among a plurality of servers, for example, BSSID information, activation order, and the like, are used. Accordingly, as the number of servers to be managed increases, it is possible to reduce time and effort in assuring security. Also, the amount of information among a plurality of servers increases so that it is possible to improve the security level.

In this regard, in the above description, the authentication unit 14 performs both the authentication by the BSSID information group to be detected, and the authentication by the BSSID information group not to be detected, and determines to have failed in authentication if both of the authentication conditions are not met. However, the authentication unit 14 may perform authentication only by the BSSID information group to be detected. Also, the authentication unit 14 may perform authentication only by the BSSID information group not to be detected. Further, the authentication unit 14 may perform authentication by a reception radio field intensity to be detected. In this case, it is possible for the authentication unit 14 of each server PSv to determine whether radio waves received in the wireless LAN communication fall within the range of the radio field intensity illustrated in the radio field intensity information 217±α of each server PSv in FIG. 3B so as to perform authentication by the reception radio field intensity to be detected.

Example of Hardware Configuration

Figure 12:
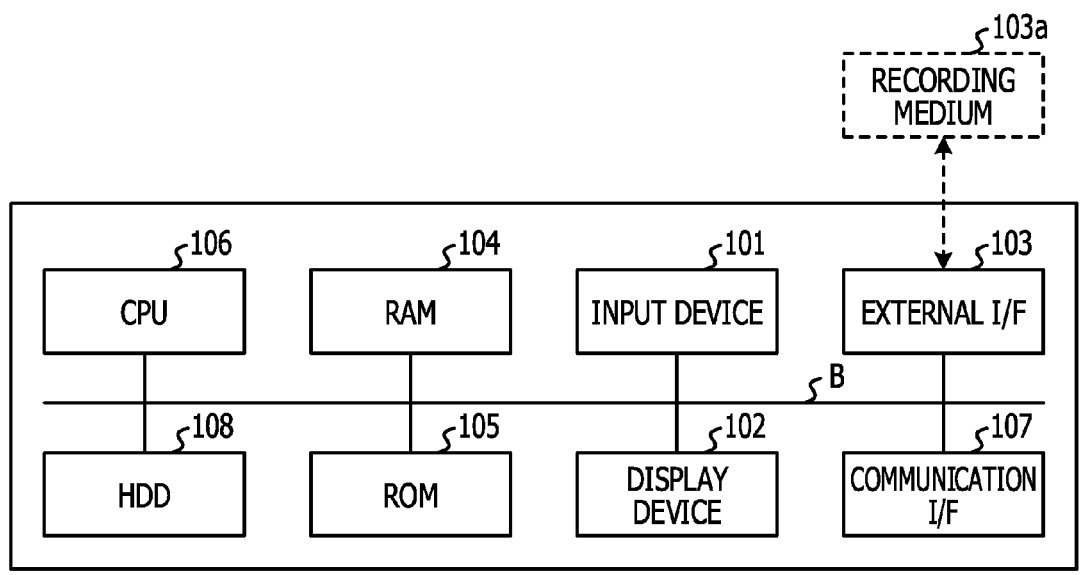
FIG. 12 is a diagram illustrating an example of a hardware configuration of the server according to an embodiment.

Lastly, a brief description will be given of a hardware configuration of the server PSv according to an embodiment. FIG. 12 illustrates an example of a hardware configuration of the server PSv according to the present embodiment. The server PSv includes an input device 101, a display device 102, an external I/F 103, a random access memory (RAM) 104, a read only memory (ROM) 105, a central processing unit (CPU) 106, a communication I/F 107, and a hard disk drive (HDD) 108, and the individual components are mutually connected through a bus B.

The input device 101 includes a keyboard, a mouse, and the like, and is used for inputting each operation into the server PSv. The display device 102 includes a display, and the like, and displays a system operation state, such as authentication, communication, and the like to the administrator of the server PSv.

The communication I/F 107 is an interface for connecting to a wireless LAN. Thereby, it is possible to perform radio communication with the servers PSv and mobile devices through the communication I/F 107.

The HDD 108 is a nonvolatile storage device for storing programs and data. The programs and data to be stored includes an operating system (OS), which is basic software for controlling the entire device, application software, which provides various functions on the OS, and the like. Also, the HDD 108 stores programs, executed by the CPU 106, for performing the connection mode determination processing, the activation preparation processing, and the activation processing according to the embodiment.

The external I/F 103 is an interface with external devices. The external devices include a recording medium 103a, or the like. It is possible for the server PSv to read and/or write data from and/or to the recording medium 103a through the external I/F 103. The recording medium 103a includes a compact disk (CD), a digital versatile disk (DVD), an SD memory card, a universal serial bus memory (USB) memory, and the like. The programs for executing connection mode determination processing, activation preparation processing, and activation processing according to an embodiment may be recorded in the recording medium 103a.

The ROM 105 is a nonvolatile semiconductor memory (storage device), and stores programs, and data, such as a basic input/output system (BIOS) executed at the time of activation, OS settings, network settings, and the like. The RAM 104 is a volatile semiconductor memory (storage device) for temporarily holding programs and data. The CPU 106 is an arithmetic unit for achieving loaded functions by reading programs and data from the above-described storage devices (for example, an "HDD", a "ROM", or the like) into the RAM, and executing the connection mode determination processing, the activation preparation processing, the activation processing, and the like. Also, the CPU 106 controls delivery of an application.

The functions of the activation control unit 23, the connection control unit 11, the setting unit 13, and the authentication unit 14 may be achieved by the CPU 106 executing the programs for executing the connection mode determination processing, the activation preparation processing, and the activation processing, which are installed in the HDD 108, or the like, according to an embodiment. Also, it is possible to achieve the authentication information storage DB 21, and the delivery application data storage DB 26 using, for example, the RAM 104, the HDD 108, or storage devices connected to the server PSv through a wireless LAN.

In the above, a description has been given of the information processing device, the authentication control method, and the program by the above-described embodiment. However, the present disclosure is not limited to the above-described embodiments, and it is possible to make various changes, modifications, and improvements within the scope of the present disclosure.

For example, the individual functions of the server PSv may be achieved by software, or may be achieved by hardware, or may be achieved by a combination of software and hardware.

Also, in the present disclosure, a device that generates the authentication information, such as the BSSID information to be detected, or the like, may be a smart phone or a tablet terminal of a server administrator, or a store staff member. The generated authentication information may be transmitted from a smart phone or a tablet terminal to an information processing device, such as a server or the like, that performs the activation processing (including the authentication processing).

Also, in the present disclosure, if the authentication processing fails for a certain time period in the activation processing, the information processing device may generate an alarm sound, or may start generation processing of the authentication information again.

The ROM 105 stores a plurality of instructions, which when executed by the processor, cause the the CPU 106 to execute storing first authentication information regarding other information processing device which ought to exist around the information processing device; detecting a wireless communication signal which is generated by the other information processing device; identifying the other information processing device based on the wireless communication signal; judging whether second authentication information of the other information processing device, which is identified by the identifying, corresponds to the first authentication information or not; permitting an access to the predetermined information when the other information processing device is determined to exist around the information processing device by the judging.

The first authentication information includes an intensity range of the wireless communication signal which is ought to be detected by the information processing device. Additionally, the identifying identifies an intensity of the wireless communication signal as the second authentication information. Additionally, the judging judges that the second authentication information corresponds to the first authentication information when the signal intensity is within the range.

The first authentication information includes an order of activation for the other information processing device. Additionally, the identifying identifies an activation order for the other information processing device as the second authentication information based on a number of the other information processing device which is previously identified by the identifying; Additionally, the judging judges that the second authentication information corresponds to the first authentication information when the activation order corresponds to the order of activation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. Any one of information processing devices among a plurality of the information processing devices capable of communicating with one another, the information processing device comprising:
   a hardware processor; and
   a memory which stores a plurality of instructions, which when executed by the processor, cause the processor to execute:
   if own device is first activated among the plurality of information processing devices having been shut down at a specific time, enabling a connection mode of a wireless LAN, and waiting until a connection is established from another information processing device among the plurality of information processing devices;
   setting authentication information based on information obtained through wireless LAN communication from the activated information processing device;
   performing authentication for enabling the own device based on the authentication information; the setting authentication information includes obtaining
   service set identifier (SSID) information of the wireless LAN from all the other information processing devices as the authentication information, determining an activation order of the plurality of information processing devices from the obtained SSID information, and setting at least one of SSID information to be detected by each of the information processing devices and SSID information not to be detected based on the activation order, and activation time information of each of the information processing devices.

2. The information processing device according to claim 1, further comprising:
   notifying the authentication information;
   restarting the own device at a time corresponding to the activation time information from the shutdown after the notifying;
   wherein the performing authentication includes enabling the function of the own device based on the authentication information after the restarting.

3. The information processing device according to claim 2,
   wherein the setting includes setting a radio field intensity information to be detected by each of the information processing devices,
   wherein the notifying includes notifying the radio field intensity to be detected, and
   wherein the performing authentication includes performing authentication for enabling the function of the own device based on at least one of the SSID information to be detected after the restarting, the SSID information not to be detected, and the radio field intensity information to be detected.

4. A method of controlling authentication, the method comprising:
   any one of information processing devices among a plurality of the information processing devices capable of communicating with one another, if own device is first activated among the plurality of information processing devices having been shut down at a specific time, enabling a connection mode of a wireless LAN, and waiting until a connection is established from another information processing device among the plurality of information processing devices;
   setting, by a computer processor, authentication information based on information obtained through wireless LAN communication from the activated information processing device;
   performing authentication for enabling the own device based on the authentication information; the setting authentication information includes obtaining
   service set identifier (SSID) information of the wireless LAN from all the other information processing devices as the authentication information, determining an activation order of the plurality of information processing devices from the obtained SSID information, and setting at least one of SSID information to be detected by each of the information processing devices and SSID information not to be detected based on the activation order, and activation time information of each of the information processing devices.

5. The method of controlling authentication according to claim 4, further comprising:
   notifying the authentication information;
   restarting the own device at a time corresponding to the activation time information from the shutdown after the notifying;
   wherein the performing authentication includes enabling the function of the own device based on the authentication information after the restarting.

6. The method of controlling authentication according to claim 5,
   wherein the setting includes setting a radio field intensity information to be detected by each of the information processing devices,
   wherein the notifying includes notifying the radio field intensity to be detected, and
   wherein the performing authentication includes performing authentication for enabling the function of the own device based on at least one of the SSID information to be detected after the restarting, the SSID information not to be detected, and the radio field intensity information to be detected.

7. A computer-readable non-transitory storage medium storing an authentication control program that causes a computer to execute a process comprising:
   any one of information processing devices among a plurality of the information processing devices capable of communicating with one another, if own device is first activated among the plurality of information processing devices having been shut down at a specific time, enabling a connection mode of a wireless LAN, and waiting until a connection is established from another information processing device among the plurality of information processing devices;
   setting authentication information based on information obtained through wireless-LAN communication from the activated information processing device;
   performing authentication for enabling the own device based on the authentication information; the setting authentication information includes obtaining
   service set identifier (SSID) information of the wireless LAN from all the other information processing devices as the authentication information, determining an activation order of the plurality of information processing devices from the obtained SSID information, and setting at least one of SSID information to be detected by each of the information processing devices and SSID information not to be detected based on the activation order, and activation time information of each of the information processing devices.

8. The computer-readable non-transitory storage medium according to claim 7, further comprising:
  notifying the authentication information;
  restarting the own device at a time corresponding to the activation time information from the shutdown after the notifying;
  wherein the performing authentication includes enabling the function of the own device based on the authentication information after the restarting.

9. The computer-readable non-transitory storage medium according to claim 8,
  wherein the setting includes setting a radio field intensity information to be detected by each of the information processing devices,
  wherein the notifying includes notifying the radio field intensity to be detected, and
  wherein the performing authentication includes performing authentication for enabling the function of the own device based on at least one of the SSID information to be detected after the restarting, the SSID information not to be detected, and the radio field intensity information to be detected.

* * * * *